US006120556A

United States Patent [19]

Nishino et al.

[11] Patent Number: 6,120,556

[45] Date of Patent: Sep. 19, 2000

[54] STABILIZING AGENT FOR PEROXIDE-BLEACHING PROCEDURE AND METHODS OF BLEACHING A FIBER MATERIAL BY USING SAME

[75] Inventors: Fumiaki Nishino, Tokyo; Ryuichi Kayama; Sachiko Kusano, both of Koriyama, all of Japan

[73] Assignee: Nippon Peroxide Co., Ltd., Tokyo, Japan

[21] Appl. No.: 08/877,017

[22] Filed: Jun. 16, 1997

[30] Foreign Application Priority Data

Jun. 21, 1996 [JP] Japan .................................... 8-161757

[51] Int. Cl.[7] ................................ D06L 3/02; D06L 3/04; C01B 15/00; D21C 9/16

[52] U.S. Cl. .................... 8/111; 252/186.25; 252/186.26; 252/186.27; 252/186.28; 252/186.29; 252/186.31; 162/78

[58] Field of Search ............................ 8/111; 252/186.25, 252/186.26, 186.27, 186.28, 186.29, 186.31, 186.3; 162/72, 78

[56] References Cited

U.S. PATENT DOCUMENTS

| | | | |
|---|---|---|---|
| 3,663,357 | 5/1972 | Liebergott | 8/111 |
| 3,890,291 | 6/1975 | Vogt et al. | 525/328.8 |
| 4,363,699 | 12/1982 | DeCeuster et al. | 162/71 |
| 4,732,650 | 3/1988 | Michalowski et al. | 162/17 |
| 5,013,404 | 5/1991 | Christansen et al. | 162/72 |
| 5,118,436 | 6/1992 | Aoyagi et al. | 252/186.42 |
| 5,503,709 | 4/1996 | Burton | 162/6 |
| 5,571,378 | 11/1996 | Elofson et al. | 162/65 |
| 5,691,193 | 11/1997 | Price et al. | 435/278 |
| 5,704,947 | 1/1998 | Kaser et al. | 8/111 |
| 5,820,636 | 10/1998 | Angstmann et al. | 8/111 |

FOREIGN PATENT DOCUMENTS

| | | |
|---|---|---|
| 0 511 695 | 11/1992 | European Pat. Off. . |
| 0 512 590 | 11/1992 | European Pat. Off. . |
| 5-148785 | 6/1993 | European Pat. Off. . |
| 57-49561 | 10/1982 | Japan . |
| 60-1360 | 1/1985 | Japan . |
| 63-251410 | 10/1988 | Japan . |
| 5-148784 | 6/1993 | Japan . |
| 7-10505 | 1/1995 | Japan . |

*Primary Examiner*—Joseph D. Anthony

*Attorney, Agent, or Firm*—McAulay Nissen Goldberg Kiel & Hand, LLP

[57] ABSTRACT

A stabilizing agent for peroxide-bleaching procedure includes (A) a component including a homopolymer or copolymer of α-hydroxyacrylic acid or water soluble salt or polylactone of the homo- or co-polymer, (B) a component including a homopolymer or copolymer of acrylic acid, methacrylic acid and/or maleic acid and water-soluble salt of the homo- or co-polymer, (C) a component including DTPA, TTHA or water-soluble salt thereof and optionally (D) a component including a water-soluble inorganic Mg salt and is used to pretreat a fiber material with a pretreating liquid containing the stabilizing agent before bleaching with peroxide, or to bleach the fiber material by a bleaching liquid containing a peroxide bleaching agent and the stabilizing agent.

15 Claims, No Drawings

STABILIZING AGENT FOR PEROXIDE-BLEACHING PROCEDURE AND METHODS OF BLEACHING A FIBER MATERIAL BY USING SAME

BACKGROUND OF THE INVENTION (1) Field of the Invention

The present invention relates to a stabilizing agent for a peroxide-bleaching procedure and methods of bleaching a fiber material by using the stabilizing agent. More particularly, the present invention relates to a silicate-free stabilizing agent for a peroxide-bleaching procedure and methods of bleaching a fiber material with a peroxide-containing bleaching agent under a stabilized condition, by preventing decomposition of the bleaching agent by impurities, for example, heavy metal ions and alkaline earth metals, introduced from the fiber material and industrial water into the bleaching system, with the silicate-free stabilizing agent.

The term "a fiber material" used herein includes fiber masses, fine fibrous particles, slivers, tows, yarns, webs, tapes, sheets (woven, knitted and nonwoven fabrics), and shaped articles comprising at least one type of natural organic and inorganic fibers, and wood and non-wood pulps.

(2) Description of the Related Art

It is well-known that conventional chlorine-containing bleaching agents, for example, chlorine gas and hypochlorous acid salts, are cheap and have a strong bleaching activity for various fiber materials and paper-forming pulps. However, the chlorine-containing bleaching agents are disadvantageous in that they per se are dangerous in corrosion of the skin and apparatus and in production of harmful substances, for example, dioxins and chloroform. Currently, the chlorine-containing bleaching agents are, therefore, being superseded by oxygen-containing bleaching agents, for example, oxygen gas and peroxo compounds.

The conventional bleaching method using the oxygen-containing bleaching agents will be explained below by taking a bleaching method using hydrogen peroxide as an example.

Generally, a bleaching method using hydrogen peroxide is carried out under an alkaline condition. The alkali is preferably selected from sodium hydroxide and sodium carbonate. When the hydrogen peroxide-bleaching procedure is carried out under alkaline conditions and the bleaching system contains some heavy metal ions, for example, Mn and Fe ions, hydrogen peroxide is rapidly decomposed in the presence of the heavy metal ions. Therefore, to enhance the bleaching efficiency, the decomposition of hydrogen peroxide has to be prevented by adding a stabilizing agent to the bleaching system. Usually, sodium silicate is used as a decomposition-preventing agent for hydrogen peroxide.

Sodium silicate is advantageous in its low price and high stabilizing effect on hydrogen peroxide. However, when sodium silicate is added to a bleaching system containing multivalent metal ions, for example, calcium and magnesium, it causes a deposition of water-insoluble silicate scale on the surfaces of individual fibers in the fiber material and the inside surfaces of the bleaching apparatus, the scaled fiber material exhibits a bad hand feeling and a degraded sewing property, and the scales on the inside surfaces of the bleaching apparatus damage the individual fibers in the fiber material. Sometimes, the individual fibers are broken by the scales. These phenomena is referred to as silicate obstruction.

Also, in production of paper and pulp using sodium silicate, the silicate scale causes stoppage of pipelines and machine, clogging of wire nets and staining of dryer. These phenomena also cause hole-formation on the resultant paper sheets, insufficient water removal by the paper-forming blanket and staining of the paper-drying canvas.

Recently, for the purpose of reducing a consumption of fresh industrial water in response to supply shortages of industrial water and of preventing environmental pollution due to waste water discharged from the paper and pulp-producing factory, it has been attempted to introduce a closed water-recycling system in which the discharge of the waste water is restricted to the utmost. The closed system is now practically utilized in some factories. When sodium silicate is used in a closed bleaching system, the resultant water-insoluble silicate is accumulated in the bleaching system, and deposited on the inside surfaces of the bleaching vessel and pipelines and thus causes water recycling through the system to be affected.

To prevent the silicate obstruction, it has been attempted to replace the sodium silicate by a non-silicate type organic metal-chelating agent.

Japanese Examined Patent Publication No. 60-1,360 discloses that poly-α-hydroxyacrylic acid salt (PHAS) is an excellent stabilizing agent for hydrogen peroxide used as a bleaching agent. PHAS is, however, disadvantageous in that when a concentration of heavy metal ions, for example, manganese (Mn), iron (Fe) and copper (Cu) ions, especially manganese ions, introduced in the bleaching system fluctuates, the PHAS cannot follow the fluctuation and thus sufficiently stabilize the bleaching system. Therefore, the bleaching effect by hydrogen peroxide cannot be kept sufficiently constant. In the bleaching system for pulp, the concentration of the heavy metal ions, for example, Mn, Fe and Cu ions, always fluctuates due to change in type of tree for the pulp and in the composition of the industrial water. Accordingly, the PHAS is unsatisfactory as a stabilizing agent for practical pulp-bleaching systems.

To solve the above-mentioned problem due to the heavy metal ions, Japanese Unexamined Patent Publication No. 5-148,784 provides a bleaching process in which lignocellulose-containing pulp material is pre-treated with an aqueous acid solution at a pH value of 1 to 6 and then with an aqueous solution of an alkaline earth metal-containing compound at a pH value of 1 to 7, and bleached with ozone or a peroxo compound, and Japanese Unexamined Patent Publication No. 5-148,785 provides a bleaching method in which a lignocellulose-containing pulp material is pre-treated with an aqueous solution of nitrogen-containing carboxylic acid-complexing agent at a pH value of 3.1 to 9.0 and then bleached with ozone or a peroxo compound.

The pre-treatments disclosed in the Japanese publications are unsatisfactory in heavy metal-removal effect. Further, in the bleaching procedure with the peroxo compound of the above-mentioned processes, sometimes, an additive selected from, for example, magnesium-containing compounds must be added to the bleaching solution, to control the physical properties, for example, viscosity, of the bleaching solution.

Further, alkaline earth metals, for example, magnesium (Mg) and calcium (Ca) are introduced from the pulp material and industrial water into the bleaching solution, and thus the concentration of the alkaline earth metals in the bleaching solution fluctuates due to the industrial water and the pulp material. The alkaline earth metals per se do not promote the decomposition of hydrogen peroxide. However, these metals react with a chelating agent added as a stabilizing agent for hydrogen peroxide to the bleaching solution and cause the stabilizing function of the chelating agent to be reduced or lost. Accordingly, the stability of the bleaching solution containing hydrogen peroxide is significantly reduced with an increase in the concentration of the alkaline earth metals in the bleaching solution.

Usually, a bleaching procedure with a peroxide bleaching agent, for example, hydrogen peroxide is carried out in a range of pH values from 8 to 12. Therefore, a stabilizing agent for a peroxide bleaching procedure is required to be constantly effective over the range of pH values 8 to 12. However, the stabilizing effect of the conventional stabilizing agent varies depending on the pH value of the peroxide bleaching system.

Accordingly, there is a strong demand for a new type of stabilizing agent capable of exhibiting a constant high stabilizing effect for a peroxide bleaching procedure over a range of the pH values from 8 to 12.

SUMMARY OF THE INVENTION

An object of the present invention is to provide a stabilizing agent free of silicic acid compounds and useful for peroxide-bleaching procedures and methods of bleaching a fiber material using the stabilizing agent.

Another object of the present invention is to provide a stabilizing agent capable of causing a peroxide-bleaching procedure to exhibit an excellent bleaching effect even when concentrations of heavy metals, for example, Mn, Fe and Cu and alkaline earth metals, for example, Mg and Ca, in a bleaching solution fluctuate, and methods of bleaching a fiber material with a high bleaching efficiency by using the stabilizing agent.

Still another object of the present invention is to provide a stability agent capable of exhibiting a high constant stabilizing effect on a peroxide bleaching procedure in a range of pH value from about 8 to about 12, and methods of bleaching a fiber material with a high bleaching efficiency by using the stabilizing agent.

The above-mentioned objects can be attained by the stabilizing agent of the present invention for a peroxide-bleaching procedure, which comprises:

(A) a first component comprising at least one member selected from the class consisting of homopolymers of α-hydroxyacrylic acid, copolymers of α-hydroxyacrylic acid with other comonomers and water-soluble salts and polylactones of the above-mentioned homopolymers and copolymers;

(B) a second component comprising at least one member selected from the class consisting of homopolymers and copolymers of acrylic acid, methacrylic acid and maleic acid, copolymers of at least one of the above-mentioned acids with other comonomers and water-soluble salts of the above-mentioned homopolymers and copolymers; and (C) a third component comprising at least one member selected from the class consisting of diethylenetriaminepentaacetic acid, triethylenetetramine hexaacetic acid and water-soluble salts of the above-mentionedacids.

The stabilizing agent of the present invention optionally further comprises (D) a fourth component comprising at least one water-soluble inorganic magnesium salt, in addition to the first, second and third components (A), (B) and (C).

The method of the present invention for bleaching a fiber material comprises:

(1) pretreating a fiber material with an aqueous solution of a stabilizing agent comprising:

(A) a first component comprising at least one member selected from the class consisting of an α-hydroxyacrylic homopolymer and copolymers of α-hydroxyacrylic acid with other comonomers, and water-soluble salts and polylactones of the above-mentioned homopolymers and copolymers;

(B) a second component comprising at least one member selected from the class consisting of homopolymers and copolymers of acrylic acid, methacrylic acid and maleic acid, copolymers of at least one of the above-mentioned acids with other monomers and water-soluble salts of the above-mentioned homopolymers and copolymers; and (C) a third component comprising at least one member selected from the class consisting of diethylenetriaminepentaacetic acid, triethylenetetramine hexaacetic acid and water-soluble salts of the above-mentioned acids; and (2) bleaching the pretreated fiber material with an aqueous solution of a bleaching agent comprising at least one bleaching peroxide compound.

In the above-mentioned method, the stabilizing agent optionally further comprises (D) a fourth component comprising at least one water-soluble inorganic magnesium salt, in addition to the first, second and third components (A), (B) and (C).

The alternative method of the present invention for bleaching a fiber material comprises bleaching a fiber material with an aqueous solution comprising:

(1) a bleaching agent comprising at least one bleaching peroxide compound; and (2) a stabilizing agent comprising (A) a first component comprising at least one member selected from the class consisting of homopolymers of α-hydroxyacrylic acid and copolymers of α-hydroxyacrylic acid with other comonomers, and water-soluble salts and polylactones of the above-mentioned homopolymers and copolymers;

(B) a second component comprising at least one member selected from the class consisting of homopolymers and copolymers of acrylic acid, methacrylic acid and maleic acid, copolymers of at least one member of the above-mentioned acids with other comonomers, and water soluble salts of the above-mentioned homopolymers and copolymers; and (C) a third component comprising at least one member selected from the class consisting of diethylenetriaminepentaacetic acid and triethylenetetramine hexaacetic acid and water-soluble salts of the above-mentioned acids.

In the above-mentioned alternative method of the present invention, the stabilizing agent optionally further comprises (D) a fourth component comprising at least one water-soluble inorganic magnesium salt, in addition to the first, second and third components (A), (B) and (C).

DESCRIPTION OF THE PREFERRED EMBODIMENTS

The stabilizing agent of the present invention for a peroxide-bleaching procedure comprises specific three components (A), (B) and (C).

The first component (A) comprises at least one member selected from the class consisting of homopolymers of α-hydroxyacrylic acid, copolymers of α-hydroxyacrylic acid with other comonomers, and water-soluble salts and polylactones of the above-mentioned homopolymers and copolymers.

The homopolymers usable for the first component (A) include homopolymers of α-hydroxyacrylic acid and water-soluble salts, for example, alkali metal salts such as sodium and potassium salts and ammonium salt, of the α-hydroxyacrylic acid homopolymer, and preferably selected from sodium and potassium salts of poly-α-hydroxyacrylic acid.

The α-hydroxyacrylic acid homopolymer can be converted to a corresponding polylactone. The α-hydroxyacrylic acid salt homopolymer can be prepared by reacting the corresponding polylactone with an alkali substance, for example, an alkali metal hydroxide or ammonia in an aqueous medium. This preparation method is disclosed in Japanese Unexamined Patent Publication No. 63-251,410.

The comonomers for the copolymers of α-hydroxyacrylic acid are preferably selected from ethylenically unsaturated aliphatic carboxylic acids, for example, acrylic acid, methacrylic acid, and maleic acid, and other ethylenically unsaturated comonomers, for example, acrylic amide, alkyl acrylates and butadienes.

In the α-hydroxyacrylic acid copolymers usable for the present invention, the molar ratio of the α-hydroxyacrylic acid to the comonomers is preferably 50/50 or more, more preferably 80/20 or more, still more preferably 90/10 to 95/5. A preferable copolymer is selected from α-hydroxyacrylic acid/acrylic acid copolymers. The preparation methods for the α-hydroxyacrylic acid/acrylic acid copolymers are disclosed in Japanese Examined Patent Publication No. 57-49,561.

The α-hydroxyacrylic acid copolymers may be converted to corresponding water soluble salts (for example, sodium, potassium and ammonium salts) and polylactones of the α-hydroxyacrylic acid copolymers.

Preferably, the first component (A) comprises at least one member selected from the homopolymers and copolymers of α-hydroxyacrylic and water-soluble salts of the homopolymer and copolymers.

In the homopolymers and copolymers of α-hydroxyacrylic acid and salts thereof, some of the carboxyl groups or carboxylic salt groups are optionally converted to amide groups, carboxylic ester groups; and/or nitrile groups.

The homopolymers and copolymers usable for the first component (A) preferably have an average molecular weight of 2,000 to 500,000, more preferably 3,000 to 100,000.

The first component (A) is soluble in water. To enhance the solubility in water, the alkali metal salt or ammonium salt form of the α-hydroxyacrylic acid homopolymer and copolymers are most preferable.

The second component (B) of the stabilizing agent of the present invention comprises at least one member selected from the class consisting of homopolymers and copolymers of acrylic acid, methacrylic acid and maleic acid, copolymers of at least one of the above-mentioned acids with other comonomers and water-soluble salts of the above-mentioned homopolymers and copolymers.

The homopolymers for the second component (B) include polyacrylic acid, polymethacrylic acid, polymaleic acid and water-soluble salts of the above-mentioned polycarboxylic acids, for example, alkali metal salts such as sodium salts and potassium salts, and ammonium salts of polyacrylic acid, polymethacrylic acid and polymaleic acid. Preferably, the homopolymers for the second component (B) are selected from the water-soluble salts of polyacrylic acid polymethacrylic acid and polymaleic acid.

The copolymers usable for the second component (B) include copolymers of at least two of acrylic acid, methacrylic acid and maleic acid, copolymers of at least one of acrylic acid, methacrylic acid and maleic acid with other comonomers and water-soluble salts of the above-mentioned copolymers. The comonomers may be selected from ethylenically unsaturated compounds other than α-hydroxyacrylic acid, acrylic acid, methacrylic acid and maleic acid, for example, acrylamide, acrylic esters, for example, methyl acrylate, ethyl acrylate, 2-hydroxyethyl acrylate and polyethyleneglycol acrylate, methacrylic esters, for example, polyethyleneglycol methacrylate, 2-hydroxyethyl methacrylate and methyl methacrylate, and alkene and diene compounds having 2 to 6 carbon atoms.

The copolymers for the second component (B) are preferably selected from sodium acrylate/methyl acrylate copolymers, acrylic acid/polyethyleneglycol methacrylate copolymers, acrylic acid/methylmethacrylate copolymers and magnesium maleate/butadiene copolymers. Generally, the homopolymers and copolymers usable for the second component (B) preferably have an average molecular weight of 3,000 to 15,000, more preferably 5,000 to 13,000.

In the homopolymers and copolymers usable for the second component (B), some of the carboxyl groups or carboxylic salt groups are optionally converted to amide groups, carboxylic ester groups and/or nitrile groups.

Also, in the homopolymers and copolymers usable for the second component (B), the carboxyl groups are preferably converted to carboxylic salt groups.

The third component (C) usable for the stabilizing agent of the present invention comprises at least one member selected from the class consisting of diethylenetriaminepentaacetic acid, triethylenetetraminehexaacetic acid, and water-soluble salts of the above-mentioned acids, for example, alkali metal salts such as sodium and potassium salts, and ammonium salts of diethylenetriaminepentaacetic acid and triethylenetetraminehexaacetic acid. The third component (C) preferably consists of sodium diethylenetriaminepentaacetate.

Each of the components (A), (B) and (C) can exhibit a high stabilizing effect on the peroxide bleaching procedure only in the following range of pH value:

Component (A): pH value range of 9 to 10.5

Component (B): pH value range of 10.5 to 11.5

Component (C): pH value range of 8 to 9.

Namely, the peroxide stabilizing effect of the component (A) is unsatisfactory in pH value ranges of less than 9 and more than 10.5, the stabilizing effect of the component (B) is unsatisfactory in the pH ranges of less than 10.5 and more than 11.5, and the stabilizing effect of the component (C) is unsatisfactory in the pH range of more than 9.0.

Also, when a fiber material is bleached with a peroxide bleaching agent in an aqueous bleaching system containing heavy metal ions such as Mn, Fe, and Cu ions and alkaline earth metal ions such as Mg and Ca ions, each of the components (A), (B) and (C) and combinations of only two of the components (A), (B) and (C) exhibit an unsatisfactory stabilizing effect on the peroxide bleaching procedure. However, it was found in the present invention that in the case where the components (A), (B) and (C) are employed altogether, the resultant stabilizing composition exhibits an unexpected excellent and constant stabilizing activity for the peroxide bleaching procedure even when the pH value of the peroxide bleaching system varies in the wide range of from 8 to 12, and even when the peroxide-bleaching system contains heavy metal ions and alkaline earth metal ions and the concentration of metal ions fluctuates greatly.

The stabilizing mechanism of the stabilizing agent of the present invention is not fully clear. However, it is assumed that the component (B) absorbs complexes of the heavy metal compounds, for example, heavy metal hydroxides, with the alkaline metal compounds so that the chelating effect of the component (A) for the heavy metal ions and the sequestering effect of the component (C) for the heavy metal ions are promoted and, as a result, the combination of the components (A), (B) and (C) exhibit an unexpected synergistic action for stabilizing the peroxide bleaching procedure.

The stabilizing agent of the present invention is applied together with the peroxide bleaching agent to the fiber material. Alternatively, the stabilizing agent is applied to the fiber material prior to the peroxide bleaching procedure.

In the stabilizing agent of the present invention, it is preferable that the first component (A) comprises a member selected from the group consisting of poly-α-hydroxyacrylic acid and water-soluble salts thereof; the second component (B) comprises a member selected from the group consisting of polyacrylic acid and water-soluble salts thereof; and the third component (C) comprises a member selected from the group consisting of diethylenetriamine pentaacetic acid and water-soluble salts thereof.

Also, in the stabilizing agent of the present invention, the first, second and third components (A), (B) and (C) are preferably present in a mixing ratio in weight of 5 to 50:20 to 70:20 to 70, more preferably 10 to 30:30 to 60:30 to 60.

Further, the first, second and third components (A), (B) and (C) are respectively contained in amounts of preferably 5 to 50 parts by weight, 20 to 70 parts by weight and 20 to 70 parts by weight, more preferably 10 to 30 parts by weight, 30 to 60 parts by weight and 30 to 60 parts by weight, per 100 parts by weight of the total of the components (A), (B) and (C).

The stabilizing agent of the present invention is preferably in the state of an aqueous solution having a pH value of 6 to 11, more preferably 8 to 10. The pH-adjusted aqueous solution of the stabilizing agent of the present invention is useful for easily preparing a peroxide bleaching solution having an optimum pH value.

The pH control of the aqueous stabilizing agent solution of the present invention can be effected by employing an organic or inorganic acid substance, for example, hydrochloric acid, sulfuric acid, nitric acid, citric acid or tartaric acid, or an alkaline substance, for example, sodium hydroxide, potassium hydroxide and calcium hydroxide.

The aqueous solution of the stabilizing agent of the present invention optionally contains an aliphatic hydroxyl compound, for example, ethyl alcohol or ethylene glycol, a thickening agent, for example, polyvinyl alcohol and a surfactant, for example, polyoxyethylene alkyl ethers, alkyl sulfates, and polyoxyethylene alkylphenyl ether sulfates.

The stabilizing agent of the present invention optionally further comprises (D) a fourth component comprising at least one water-soluble inorganic magnesium salt, in addition to the components (A), (B) and (C).

The fourth component (D) is contributory to enhancing the stabilizing effect of the resultant stabilizing agent for the peroxide-bleaching procedure. The water-soluble inorganic magnesium compound for the fourth component (D) is preferably selected from magnesium sulfate, magnesium chloride, and magnesium nitrate, and a more preferable compound is magnesium sulfate.

When the fourth component (D) is contained, the stabilizing agent of the present invention comprises the components (A), (B), (C) and (D) in a weight ratio of preferably 2 to 30:10 to 50:10 to 50:20 to 70, more preferably 3 to 10:20 to 40:20 to 40:25 to 50.

Also, the stabilizing agent of the present invention comprises the components (A), (B), (C) and (D) in amounts of preferably 2 to 30 parts by weight, 10 to 50 parts by weight, 10 to 50 parts by weight and 20 to 70 parts by weight, more preferably 3 to 10 parts by weight, 20 to 40 parts by weight, 20 to 40 parts by weight and 25 to 50 parts by weight, per 100 parts by weight of the total of the components (A), (B), (C) and (D).

Preferably, the fourth component (D) is dissolved together with the other components (A), (B) and (C) in water to prepare an aqueous solution thereof, prior to employment, when the fourth component (D) is dissolved together with the other components (A) to (C) in water and the resultant aqueous solution is added to the aqueous peroxide bleaching solution, the resultant bleaching solution exhibits a significantly enhanced stability of the peroxide bleaching agent, compared with the case where the component (D) is added, separately from the other components (A) to (C), directly into the aqueous peroxide bleaching solution. This specific effect will be later illustrated by Example 17. Accordingly, the four component stabilizing agent of the present invention is preferably in the state of an aqueous solution thereof, before employment. The aqueous solution of the stabilizing agent comprising the components (A), (B), (C) and (D) is preferably adjusted to a pH of 6 to 11, more preferably 6 to 8. In this pH range, the magnesium compounds of the fourth component (D) can be uniformly dissolved together with the other components (A), (B) and (C) in the aqueous solution.

The stabilization-enhancing mechanism of the water-soluble inorganic magnesium salts incorporated into the stabilizing agent of the present invention to the peroxide bleaching procedure has not yet been made fully clear. However, it is assumed that when the magnesium salts interact with the polymers of the components (A) and (B) so that the original three-dimensional structures of the polymer molecules of the components (A) and (B) are modified to structures having a higher chelating reactivity with the heavy metal ions than that of the original structure. The interaction between the component (D) and the components (A) and (B) can be effected only in an aqueous medium. Also, the interaction is preferably completed before mixing the stabilizing agent into the peroxide bleaching agent-containing aqueous solution. Accordingly, it is preferable that the fourth component (D) is dissolved together with components (A), (B) and (C) in water, before being subjected to the peroxide bleaching procedure.

The stabilizing agent of the present invention can be utilized for bleaching a fiber material.

The fiber material can be selected from fiber masses, fine fibrous particles, slivers, tows, yarns, webs, tapes, sheets including woven, knitted and nonwoven fabrics and shaped articles including clothes, garments, foundation garments, hosieries and shirts, comprising at least one type of natural inorganic fibers, for example, asbestos, rockwool and repiolite fibers, and natural organic fibers, for example, cellulose fibers including wood pulp, nonwood pulp, cotton and hemp fibers, and protein fibers including silk fibers and animal hair fibers such as wool fibers.

The pulp fibers include chemical pulp fibers, for example, kraft pulp fibers and sulfite pulp fibers, mechanical pulp fibers, for example, ground pulp fibers, thermomechanical pulp fibers and refiner ground pulp fibers, semichemical pulp fibers, for example, chemi-ground pulp fibers and waste paper pulp fibers.

The peroxide bleaching of the fiber material by using the stabilizing agent of the present invention can be carried out in accordance with the following methods.

In one of the methods of the present invention, a fiber material is pretreated with an aqueous solution of the stabilizing agent as mentioned above, and then the pretreated fiber material is bleached with an aqueous solution of a bleaching agent comprising at least one bleaching peroxide compound. The pretreated fiber material is optionally rinsed with water and squeezed or dehydrated before the bleaching procedure.

The stabilizing agent optionally comprises the fourth component (D) in addition to the components (A), (B) and (C).

The aqueous solution of the stabilizing agent for the pretreatment procedure preferably contain the stabilizing agent in a concentration of 1 to 70%, more preferably 10 to 50% and has a pH of 6 to 11, more preferably 8 to 10. The stabilizing agent is preferably present in an amount of 0.01 to 5%, more preferably 0.1 to 3%, based on the absolute dry weight of the fiber material. If the amount of the stabilizing agent based on the absolute dry weight of the fiber material is less than 0.01% by weight, the pretreatment aqueous solution may not exhibit a satisfactory stabilizing effect for the following peroxide bleaching procedure. Also, if the amount of the stabilizing agent is more than 5% by weight, the stabilizing effect of the resultant pretreatment aqueous solution may be saturated and an economical disadvantage may occur.

In the pretreatment, the fiber material is present preferably in a consistency in weight of 1 to 30%, more preferably 3 to 20%, in the pretreatment aqueous solution. If the consistency is less than 1%, the resultant pretreatment effect may be satisfactory. Also, a consistency more than 30% may cause the pretreatment for the fiber material to be uneven. For example, when the fiber material is a wood pulp, the wood pulp slurry having a consistency of more than 30% may not be uniformly agitated during the pretreatment.

The pretreatment procedure is carried out preferably at a temperature of 20 to 120° C. at a pH value of 6 to 11 for 15 to 180 minutes, more preferably at a temperature of 40 to 80° C. at a pH value of 7 to 10.5 for 30 to 120 minutes. When the pretreatment temperature is 100° C. or more, the pretreatment must be carried out under pressure in a closed system. If the pretreatment temperature is too low and/or the pretreatment is too short, a satisfactory pretreatment effect may not be obtained. Also, a pretreatment temperature higher than 120° C. may cause the pretreated fiber material to be deteriorated and a pretreatment time longer than 180 minutes may cause the pretreatment effect to be saturated and an economical disadvantage to occur.

The aqueous solution of the stabilizing agent for the pretreatment procedure optionally further comprises a bleach-promoting enzyme. The bleach-promoting enzyme can be selected from commercially available enzymes, for example, xylanase, cellulase, lipase and protease. Preferably, the enzyme is used in an amount of 0.01 to 0.5%, more preferably 0.02 to 0.2%, based on the absolute dry weight of the fiber material.

An aqueous liquid discharged from the pretreatment procedure can be recovered and returned to the pretreatment procedure. The pretreatment procedure may be carried out in one single step or multiple steps.

The pretreated fiber material is bleached with an aqueous solution of a bleaching agent comprising at least one bleaching peroxide compound.

The bleaching peroxide compound can be selected from hydrogen peroxide, peroxyhydrates, for example, sodium percarbonate, and sodium perborate, peroxomonosulfuric acid and water-soluble salts thereof, for example, sodium and potassium salts thereof, and organic peroxo acids, for example, peroxyformic acid and peroxyacetic acid.

In the bleaching procedure, the fiber material is used in a consistency of preferably 1 to 30% by weight, more preferably 3 to 20% by weight, the peroxide bleaching agent is used in a content of preferably 0.01 to 5.0% by weight, more preferably 0.1 to 3.0% by weight, based on the absolute dry weight of the fiber material, in the bleaching peroxide aqueous solution.

The bleaching procedure is preferably conducted at a temperature of 20 to 120° C., more preferably 40 to 80° C., for 15 to 180 minutes, more preferably 60 to 120 minutes, at a pH value of 8 to 12, more preferably 9 to 11.

The peroxide bleaching procedure can be repeated twice or more, if necessary. Also, before and/or after the peroxide bleaching procedure, another bleaching procedure using a non-chlorine bleaching agent, for example, molecular oxygen, ozone, or thiourea dioxide, may be applied to the fiber material.

In another one of the bleaching methods of the present invention, the fiber material is bleached with an aqueous solution comprising both a peroxide bleaching agent and a stabilizing agent.

The peroxide bleaching agent can be selected from those as mentioned above.

Also, the stabilizing agent can be selected from those as mentioned above.

The bleaching procedure in the presence of the stabilizing agent is preferably carried out in a consistency of the fiber material of 1 to 30% by weight, more preferably 3 to 20% by weight in the presence of the stabilizing agent, at a temperature of 20 to 120° C., more preferably 40 to 80° C. for 15 to 180 minutes, more preferably 60 to 120 minutes. Also, the stabilizing agent is used in an amount of 0.01 to 5% by weight, more preferably 0.1 to 3% based on the weight of the fiber material.

When the bleaching process is completed, the bleaching liquid discharged from the bleaching procedure may be recovered and returned to the bleaching procedure to reuse it. Otherwise, the recovered bleaching liquid may be treated in a recovering boiler.

The bleaching procedure may be repeated twice or more. Also, before or after the peroxide bleaching procedure, another bleaching procedure using a non-chlorine bleaching agent, for example, molecular oxygen, ozone or thiourea dioxide may be applied to the fiber material.

EXAMPLE

The present invention will be further explained by the following examples.

Examples 1 to 16 and Comparative Examples 1 to 14

In each of Examples 1 to 16 and Comparative Examples 1 to 14, an aqueous solution of a stabilizing agent having a total concentration of 30% by solid weight was prepared by dissolving the components (A), (B), (C) and (D), in the amounts as shown in Table 1, in water, and the pH value of the resultant aqueous solution was adjusted to 6.9 to 10.2

TABLE 1

| | | Components | | | | | | | | Concentration of stabilizing agent | | |
|---|---|---|---|---|---|---|---|---|---|---|---|---|
| | | A | | B | | C | | D | | | | |
| | | Type | Amount (Part by weight) | Type | Amount (Part by weight) | Type | Amount (Part by weight) | Type | Amount (Part by weight) | in test solution (mg/liter) | pH value of test solution | Stability of $H_2O_2$ (%) |
| Example | 1 | PHAS | 10 | SPA1 | 45 | DTPA | 45 | — | — | 800 | 11.0 | 77.6 |
| | 2 | PHAS | 20 | SPA1 | 40 | DTPA | 40 | — | — | 800 | 11.0 | 78.2 |
| | 3 | PHAS | 20 | SPA1 | 40 | DTPA | 40 | — | — | 800 | 10.0 | 68.9 |
| | 4 | PHAS | 20 | SPA1 | 40 | DTPA | 40 | — | — | 600 | 9.0 | 92.7 |
| | 5 | PHAS | 20 | SPA1 | 40 | DTPA | 40 | — | — | 600 | 8.0 | 98.7 |
| | 6 | Copolymer 1 | 20 | SPA1 | 40 | DTPA | 40 | — | — | 600 | 11.0 | 73.3 |
| | 7 | PHAS | 20 | Copolymer 2 | 40 | DTPA | 40 | — | — | 600 | 11.0 | 72.9 |
| | 8 | PHAS | 20 | SPA1 | 40 | TTHA | 40 | — | — | 600 | 11.0 | 74.6 |
| | 9 | PHAS | 10 | Copolymer 3 | 45 | DTPA | 45 | — | — | 600 | 11.0 | 73.6 |
| | 10 | PHAS | 20 | Poly(Na maleate) | 40 | DTPA | 40 | — | — | 600 | 11.0 | 71.8 |
| | 11 | PHAS | 20 | Copolymer 4 | 40 | DTPA | 40 | — | — | 600 | 11.0 | 71.9 |
| | 12 | PHAS | 20 | SPA2 | 40 | DTPA | 40 | — | — | 600 | 11.0 | 73.9 |
| | 13 | PHAS | 20 | Copolymer 5 | 40 | DTPA | 40 | — | — | 600 | 11.0 | 71.8 |
| | 14 | PHAS | 6 | SPA1 | 27 | DTPA | 27 | $MgSO_1.7H_2O$ | 40 | 800 | 11.0 | 78.9 |
| | 15 | PHAS | 6 | SPA1 | 27 | DTPA | 27 | $MgSO_1.7H_2O$ | 40 | 800 | 10.0 | 78.8 |
| | 16 | PHAS | 7 | SPA1 | 31.3 | DTPA | 31.5 | $MgSO_1.7H_2O$ | 30 | 800 | 10.0 | 77.4 |
| | 17 | PHAS | 6 | Copolymer 2 | 27 | DTPA | 27 | $MgSO_1.7H_2O$ | 40 | 800 | 11.0 | 75.6 |
| Compar— | 1 | PHAS | 100 | — | — | — | — | — | — | 800 | 11.0 | 5.2 |
| ative | 2 | PHAS | 20 | SPA1 | 80 | — | — | — | — | 1000 | 11.0 | 21.0 |
| Example | 3 | — | — | SPA1 | 100 | — | — | — | 800 | 11.0 | 43.5 | |
| | 4 | — | — | SPA1 | 100 | — | — | — | — | 800 | 10.0 | 0.3 |
| | 5 | — | — | — | — | DTPA | 100 | — | — | 800 | 11.0 | 8.2 |
| | 6 | — | — | SPA1 | 50 | DTPA | 50 | — | — | 800 | 11.0 | 24.3 |
| | 7 | PHAS | 50 | SPA1 | 50 | — | — | — | — | 800 | 11.0 | 24.3 |
| | 8 | PHAS | 40 | — | — | DTPA | 60 | — | — | 800 | 11.0 | 25.7 |
| | 9 | — | — | — | — | — | — | $MgSO_4.7H_2O$ | 100 | 800 | 11.0 | 11.2 |
| | 10 | PHAS | 10.9 | SPA1 | 49.1 | — | — | $MgSO_4.7H_2O$ | 40 | 800 | 10.0 | 2.7 |
| | 11 | — | — | SPA1 | 30 | DTPA | 30 | $MgSO_4.7H_2O$ | 40 | 800 | 11.0 | 11.2 |
| | 12 | — | — | SPA1 | 50 | EDTMP | 50 | — | — | 800 | 11.0 | 35.6 |
| | 13 | PHAS | 20 | SPA1 | 40 | EDTA | 40 | — | — | 800 | 10.0 | 20.2 |
| | 14 | PHAS | 20 | SPA4 | 40 | EDTMP | 40 | — | — | 800 | 11.0 | 36.9 |

[Note]
The abbreviations in Table 1 mean as follows.
PHAS: Poly(sodium α-hydroxyacrylate), Average molecular weight (AMW): 13,000
SPA1: Poly(sodium acrylate), AMW : 8,000
SPA2: Poly(sodium acrylate), AMW : 5,000
Poly(Na maleate): Poly(sodium maleate), AMW: 10,000
Copolymer 1: Sodium α-hydroxyacrylate/sodium acrylate copolymer (70:30), AMW: 20,000
Copolymer 2: Sodium acrylate/methyl methacrylate copolymer (70:30), AMW = 8,000
Copolymer 3: Sodium acrylate/polyethyleneglycol methacrylate copolymer (70:30), AMW: 4,000
Copolymer 4: Butadiene/magnesium maleate copolymer (20:80), AMW: 8,000
Copolymer 5: Acrylic acid/methyl methacrylate copolymer (65:35), AMW: 50,000
DTPA: Diethylenetriamine pentaacetic acid
TTHA: Triethylenetetraamine hexaacetic acid
EDTMP: Ethylenediamine tetra (methylenesulfonic acid) sodium salt
EDTA: Ethylenediamine tetraacetic acid The resultant aqueous stabilizing agent solutions were subjected to the following stability test.

Stability Test for Hydrogen Peroxide

An aqueous test solution containing 50 mg/liter of Mg ions, 50 mg/liter of Ca ions, 5 mg/liter of Fe ions, 1 mg/liter of Cu ions, 2 mg/liter of Mn ions, 1.0 g/liter of hydrogen peroxide, and the stabilizing agent in the content as shown in Table 1, and having the pH value as shown in Table 1 was prepared by using magnesium sulfate, calcium nitrate, ferric nitrate, copper sulfate, manganese chloride, the aqueous stabilizing agent solution and a pH-adjustering agent, namely sodium hydroxide or diluted aqueous nitric acid solution.

The test solution in an amount of 50 ml was placed in a conical flask with a 100 ml capacity, and the flask was stoppered with a rubber plug having fine holes and placed in a constant temperature vessel at a temperature of 60° C. for 3 hours. Then, the flask was removed from the vessel, the test solution was cooled to room temperature, a diluted aqueous sulfuric acid solution was added to the test solution and the concentration of hydrogen peroxide remaining in the test solution was determined by an iodometric titration method. The retention (%) of hydrogen peroxide in the test solution represented the stability of hydrogen peroxide.

The test results are also shown in Table 1.

Examples 17 to 20

In each of Examples 17 to 20, an aqueous stabilizing agent solution was prepared and tested by the same procedures as in Example 1 with the following exceptions.

In Example 17, a test solution was prepared by dissolving 6 parts by weight of PHAS, 27 parts by weight of SPA1 and 27 parts by weight of DTPA in water, and further dissolving 40 parts by weight of $MgSO_4.7H_2O$ in an aqueous solution containing the heavy metal ions, alkaline earth metal ions and hydrogen peroxide as mentioned in Example 1, while adding the aqueous solution of PRAS, SPA1 and DTPA to the above-mentioned hydrogen peroxide-containing aqueous solution.

The resultant test solution contained 200 mg/liter of the stabilizing agent comprising PHAS, SPA1, DTPA and $MgSO_4.7H_2O$ and had a pH value of 11.0. The test results are shown in Table 2.

In Example 18, the same procedures as in Example 17 were carried out except that the $MgSO_4.7H_2O$ was dissolved together with PHAS, SPA1 and DTPA in water to provide an aqueous solution of the stabilizing agent, and then the aqueous stabilizing agent solution was added to the hydrogen peroxide-containing solution as mentioned above. The aqueous stabilizing agent solution had a pH value of 6.9.

The resultant test solution contained the stabilizing agent in an amount of 200 mg/liter and had a pH value of 11.0. The test results are shown in Table 2.

In Example 19, a test solution was prepared by dissolving 7 parts by weight of PHAS, 31.5 parts by weight of SPA1 and 31.5 parts by weight of DTPA in water, and then further dissolving 40 parts by weight of $MgSO_4.7H_2O$ in an aqueous solution containing the heavy metal ions, alkaline earth metal ions and hydrogen peroxide as mentioned in Example 1, while adding the aqueous solution of PHAS, SPA1 and DTPA to the above-mentioned hydrogen peroxide-containing aqueous solution.

The resultant test solution contained 400 mg/liter of the stabilizing agent comprising PHAS, SPA1, DTPA and $MgSO_4.7H_2O$ and had a pH value of 9.0. The test results are shown in Table 2.

In Example 20, the same procedures as in Example 19 were carried out except that the $MgSO_4.7H_2O$ was dissolved together with PHAS, SPA1 and DTPA in water to provide an aqueous solution of the stabilizing agent, and then the aqueous stabilizing agent solution was added to the hydrogen peroxide-containing solution as mentioned above. The aqueous stabilizing agent solution had a pH value of 7.1.

The resultant test solution contained the stabilizing agent in an amount of 400 mg/liter and had a pH value of 9.0. The test results are shown in Table 2.

TABLE 2

| Item | | Example No. | Example 17 | 18 | 19 | 20 |
|---|---|---|---|---|---|---|
| Stabil-izing agent | Com-ponents | PHAS | 6 | 6 | 7 | 7 |
| | | SPA1 | 27 | 27 | 31.5 | 31.5 |
| | | DTPA | 27 | 27 | 31.5 | 31.5 |
| | | $MgSO_4.7H_2O$ | $40(*)_1$ | $40(*)_2$ | $30(*)_1$ | $30(*)_2$ |
| | pH | | — | 6.7 | — | 7.1 |
| | Conc. in test solution (mg/l) | | 200 | 200 | 400 | 400 |
| pH of test solution | | | 11.0 | 11.0 | 9.0 | 9.0 |
| Stability of $H_2O_2$ | | | 40.6 | 53.8 | 34.4 | 85.7 |

Note: $(*)_1$ . . . $MgSO_4.7H_2O$ was dissolved together with PHAS, SPA1 and DTPA in water, and added altogether to the test solution,
$(*)_2$ . . . $MgSO_4.7H_2O$ was added, separately from PHAS, SPA1 and DTPA, to the test solution.

Table 2 shows that when the Mg salt (component (D)) was dissolved together with the other components (A), (B) and (C) in water, before being mixed with the aqueous solution containing the heavy metal ions, alkaline earth metal ions and hydrogen peroxide, the resultant test solution had a higher retention of hydrogen peroxide than that obtained by directly adding the Mg salt to the aqueous solution containing the heavy metal ions, alkaline earth metal ions and hydrogen peroxide, without dissolving the Mg salt together with components (A), (B) and (C) in water.

Example 21 and Comparative Examples 15 to 17

(Bleaching of Cotton Fabric)

In Example 21, a knitted fabric consisting of cotton yarns with a metric count of 40 was bleached by the following procedure.

| Component | Amount |
|---|---|
| 35% hydrogen peroxide | 20 ml/liter |
| Stabilizing agent of Example 1 | 2 g solid/liter |
| NaOH | 2 g solid/liter |
| Surfactant $(*)_1$ | 1 g/liter |

The resultant bleaching solution had a pH value of 10.9. The surfactant consisted of a mixture of a non-ionic surfactant and an anionic surfactant and was available under a trademark of Sanmol BH conc., from Nikka Kagaku K.K.

The cotton knitted fabric was bleached by being impregnated with the bleaching solution in an amount of 100% based on the dry weight of the fabric and heating with steam at a temperature of 95 to 97° C. for a time of 30 minutes, by a pad-steam method.

The bleached fabric was subjected to a whiteness measurement using a color difference meter, and a hand feeling test using a hand feeling tester (Tensilometer, made of Orientec K.K.). The amount of hydrogen peroxide remaining in the bleaching solution was determined by an iodometric method. The test results are shown in Table 3.

In Table 3, the b value is utilized herein as an indicator of the degree of the bleaching effect on the cotton fabric. The larger the b value, the higher the yellowness of the fabric, and the smaller the b value, the higher the blueness of the fabric. Accordingly, the smaller the b value, the higher the visual whiteness seen by the naked eye.

In Table 3, MIU means a dynamic friction coefficiency and MMD means a variation of dynamic friction coefficient. When a hand touches a surface of an article, the lower the MIU, the higher the smoothness to the hand, and the higher the MMD, the higher the roughness to the hand.

In each of Comparative Examples 15 to 17, the same procedures as in Example 21 were carried out, except that the stabilizing agent of Example 1 was replaced by 100 parts by weight of SPA1 alone in Comparative Example 15, by 100 parts by weight of DTPA alone in Comparative Example 16 and by 100 parts by weight of grade 3 sodium silicate in Comparative 17. In Comparative Example 17, the sodium silicate was used in an amount of 10 g/liter in the bleaching solution. The test results are shown in Table 3.

TABLE 3

| Example No. | Item | Stabilizing agent Components, part by weight | Retention of $H_2O_2$ (%) | Whiteness | b-value | Hand feeling MIU | Hand feeling MMD |
|---|---|---|---|---|---|---|---|
| Example 21 | | PHAS 10 : SPA 45 : DTPA 45 | 41.1 | 84.73 | 2.80 | 1.89 | 0.59 |
| Comparative Example | 15 | SPA 100 | 2.0 | 81.57 | 4.52 | 1.92 | 0.61 |
| | 16 | DTPA 100 | 3.6 | 82.22 | 4.21 | 1.81 | 0.69 |
| | 17 | Grad 3 sodium silicate | 44.0 | 84.41 | 3.32 | 2.34 | 0.84 |

Examples 22 and 23 and Comparative Examples 18 to 20

(Bleaching of Wood Kraft Pulp with Hydrogen Peroxide)

In Example 22, an aqueous bleaching solution was prepared by dissolving the same aqueous stabilizing agent solution as in Example 1 in a solid amount of 0.2% by weight, together with 1.0% by weight of $H_20_2$ and 0.5% by weight of NaOH, in water.

A unbleached Japanese hard wood pulp having a kappa value of 9.6, a viscosity of 24.8 cps and a whiteness of 43.8% was mixed in a consistency of 12% by weight in the aqueous bleaching solution, bleached at a temperature of 80° C. for 2 hours, and thereafter rinsed with water and dehydrated.

The resultant bleached pulp was subjected to a whiteness measurement, a kappa value determination, and a viscosity measurement. The discharged bleaching liquid was subjected to an analysis of the remaining hydrogen peroxide.

The whiteness was measured by a Hunter whiteness method in accordance with Japanese Industrial Standard (JIS) P 8123, the pulp viscosity was measured by TAPPI T-230 om-82, and the kappa value was determined by TAPPI T-236 hm-85. The retention of hydrogen peroxide in the discharged bleaching liquid was determined by an iodometric method.

In Example 23, the same procedures as in Example 22 were carried out except that the stabilizing agent was the same as in Example 16.

In Comparative Example 18, the same procedures as in Example 22 were carried out except that the stabilizing agent was the same as in Comparative Example 9.

In Comparative Example 19, the same procedures as in Example 22 were carried out except that the stabilizing agent was the same as in Comparative Example 16.

In Comparative Example 20, the same procedures as in Example 22 were carried out except that the stabilizing agent was the same as in Comparative Example 17.

TABLE 4

| Example No. | Item | Type of stabilizing agent | Bleached pulp: Whiteness (%) | Bleached pulp: Kappa value | Bleached pulp: Viscosity (cp) | Retention of $H_2O_2$ (%) |
|---|---|---|---|---|---|---|
| Example | 22 | Example 1 | 61.5 | 7.8 | 18.2 | 6.0 |
| | 23 | Example 16 | 60.8 | 8.0 | 20.8 | 7.5 |
| Comparative Example | 18 | Comparative Example 9 | 58.9 | 8.3 | 19.4 | 5.5 |
| | 19 | Comparative Example 16 | 60.3 | 8.2 | 20.3 | 1.5 |
| | 20 | Comparative Example 17 | 59.3 | 8.2 | 19.9 | 3.0 |

Examples 24 to 27 and Comparative Examples 21 to 26

(Bleaching of Unbleached Kraft Pulp with Hydrogen Peroxide)

In each of Examples 24 to 26 and Comparative Examples 21 to 26, the same procedures as in Example 22 were carried out, with the following exceptions. The stabilizing agent was replaced by one as shown in Table 5. The unbleached wood pulp was pretreated in a consistency of 3.5% by weight with an aqueous solution of 0.2% by weight of the stabilizing agent at a temperature of 50° C. for one hour, and then rinsed with water and dehydrated. The dehydrated wood pulp was bleached in a consistency of 12% by weight with an aqueous solution of 1.0% by weight of $H_2O_2$ and 0.5% by weight of NaOH, at a temperature of 80° C. for 2 hours, and then rinsed with water and dehydrated.

Also, in Example 27, the same procedures as in Example 24 were carried out except that the pretreatment solution contained, in addition to 0.2% by weight of the same stabilizing agent as in Example 1, 0.05% by weight a bleach-promoting enzyme (trademark: Irgazyme 40*4, made by Ciba-Geigy).

The test results are shown in Table 5.

TABLE 5

| Example No. | Item | Type of stabilizing agent | Bleached pulp: Whiteness (%) | Bleached pulp: Kappa value | Bleached pulp: Viscosity (cp) | Retention of $H_2O_2$ (%) |
|---|---|---|---|---|---|---|
| Example | 24 | Example 1 | 68.5 | 7.2 | 21.9 | 8.0 |
| | 25 | Example 14 | 67.3 | 7.3 | 21.7 | 4.5 |
| | 26 | Example 16 | 66.6 | 7.6 | 22.1 | 3.0 |
| | 27 | Example 1 | 74.6 | 5.1 | 20.8 | 6.5 |
| Comparative Example | 21 | None (pure water) | 60.5 | 8.2 | 18.7 | tr |
| | 22 | Comparative Example 2 | 64.3 | 7.8 | 21.7 | 1.5 |
| | 23 | Comparative Example 3 | 63.6 | 8.1 | 22.1 | 1.0 |
| | 24 | Comparative Example 6 | 64.9 | 7.9 | 20.6 | 4.0 |
| | 25 | Comparative Example 8 | 65.5 | 7.6 | 21.0 | 4.5 |
| | 26 | Comparative Example 11 | 64.7 | 8.1 | 19.7 | 2.5 |

Example 28 and 29 and Comparative Examples 27 to 29

(Bleaching of Kraft Pulp with Peracetic Acid)

In each Examples 28 and 29 and Comparative Example 27 to 29, the same procedures as in Example 24 were carried out except that the pretreated kraft pulp was bleached in a consistency of 12% by weight with an aqeous bleaching agent solution containing 1.0% by weight of peracetic acid (trademark: Oxypel, made by Nihon Peroxide K.K.) and having a pH value of 6.0 adjusted by NaOH, at a temperature of 60° C. for 2 hours.

The test results are shown in Table 6.

TABLE 6

| Example No | Item | Type of stabilizing agent | Bleached pulp Whiteness (%) | Kappa value | Viscosity (cp) | Retention of $H_2O_2$ (%) |
|---|---|---|---|---|---|---|
| Example | 28 | Example 1 | 65.6 | 4.1 | 23.2 | 65 |
| | 29 | Example 16 | 65.8 | 4.0 | 23.1 | 60 |
| Comparative Example | 27 | Comparative Example 16 | 64.1 | 4.3 | 22.4 | 50 |
| | 28 | Comparative Example 17 | 63.9 | 4.3 | 23.5 | 45 |
| | 29 | None (pure water) | 63.5 | 4.4 | 21.0 | 30 |

Examples 30 to 32 and Comparative Examples 30 to 36

(Bleaching of Waste Paper Pulp with Hydrogen Peroxide)

In each of Examples 30 to 32 and Comparative Examples 30 to 36, waste newspaper sheets were repulped by using a high consistency pulper, then the re-pulping slurry was mixed with 1.0% by weight of NaOH, and 0.08% by weight of an ink-removing agent (trademark: DI-800, made by Kao), the resultant mixed slurry was agitated at a temperature of 60° C. for 30 minutes, rinsed with water and dehydrated to provide an aqueous waste paper pulp slurry with a consistency of 30% by weight.

The waste paper pulp slurry was mixed with 2.0% by dry weight of NaOH, 1.0% by dry weight of $H_2O_2$, 0.16% by dry weight of the ink-removing agent, and 0.2% by dry weight of the stabilizing agent as shown in Table 7. The resultant mixture was agitated and aged at a temperature of 80° C. for 2 hours. Further, a flotation treatment was applied to the mixture.

The hue and whiteness of the resultant bleached pulp were measured by using a hue tester (trademark: Sigma 80, made by Nihon Denshoku K.K.). The retention of ink in the resultant bleached pulp was measured by an ink retention tester (trademark: Ruzex, made by Nireko K.K.).

The test results are shown in Table 7.

TABLE 7

| Example No. | Item | Type of stabilizing agent | Whiteness (%) | Hue L-value | Hue a-value | Hue b-value | Retention of ink $cm^2/m^2$ |
|---|---|---|---|---|---|---|---|
| Example | 30 | Example 1 | 61.7 | 86.83 | −0.84 | 9.23 | 18.8 |
| | 31 | Example 14 | 61.2 | 86.32 | −0.80 | 9.78 | 16.3 |
| | 32 | Example 16 | 60.7 | 85.72 | −0.76 | 10.03 | 19.8 |
| Comparative Example | 30 | Comparative Example 1 | 60.2 | 85.43 | −0.70 | 10.11 | 20.2 |
| | 31 | Comparative Example 2 | 58.9 | 84.34 | −0.50 | 10.68 | 25.6 |
| | 32 | Comparative Example 3 | 57.0 | 83.98 | −0.38 | 10.78 | 30.6 |
| | 33 | Comparative Example 6 | 57.9 | 84.11 | −0.41 | 10.58 | 28.9 |

TABLE 7-continued

| Example No. | Item | Type of stabilizing agent | Whiteness (%) | Hue L-value | Hue a-value | Hue b-value | Retention of ink $cm^2/m^2$ |
|---|---|---|---|---|---|---|---|
| | 34 | Comparative Example 8 | 59.4 | 85.43 | −0.70 | 10.41 | 27.3 |
| | 35 | Comparative Example 10 | 59.0 | 84.27 | −0.54 | 10.69 | 25.2 |
| | 36 | Comparative Example 16 | 60.4 | 85.76 | −0.67 | 10.21 | 29.3 |

As the examples clearly show, the stabilizing agent of the present invention which is free from silicates significantly contributes to stabilizing the peroxide bleaching procedure for a fiber material and to enhancing the peroxide bleaching effect on the fiber material. Also, the bleaching procedure using the stabilizing agent of the present invention is quite free from troubles relating to bleaching procedure and product quality derived from silicates.

What we claim is:

1. A method of bleaching a fiber material comprising bleaching a fiber material with an aqueous solution comprising (1) a bleaching agent comprising at least one bleaching peroxide compound; and (2) a stabilizing agent comprising (A) a first component comprising at least one member selected from the class consisting of homopolymers of α-hydroxyacrylic acid and copolymers of α-hydroxyacrylic add with other comonomers, and water-soluble salts and polylactones of the above-mentioned homopolymers and copolymers;

(B) a second component comprising at least one member selected from the class consisting of homopolymers and copolymers of acrylic acid methacrylic acid and maleic acid, copolymer of at least one member of the above-mentioned adds with other comonomers, and water soluble salts of the above-mentioned homopolymers and copolymers; and (C) a third component comprising at least one member selected from the class consisting of diethylenetriaminepentaacetic add and triethylenetetramine hexaacetic acid and water-soluble salts of the above-mentioned adds, the first, second and third components (A), (B) and (C) being present in mixing ratio in weight of 5 to 50:20 to 70:20 to 70.

2. The method as claimed in claim 1, wherein the bleaching procedure is carried out at a temperature of 20 to 120° C. for 15 to 180 minutes.

3. The method as claimed in claim 1, wherein the aqueous bleaching solution contains the stabilizing agent in a concentration of 1 to 70% and has a pH value of 6 to 11, the stabilizing agent being present in an amount of 0.01 to 5% based on the absolute dry weight of the fiber material.

4. The method as claimed in claim 1, wherein the stabilizing agent further comprises (D) a fourth component comprising at least one water-soluble inorganic magnesium salt, in addition to the first, second and third components (A), (B) and (C).

5. The method as claimed in claim 1, wherein the bleaching agent comprises at least one member selected from the group consisting of hydrogen peroxide, peroxyhydrates, peroxomonosulfuric acid and water-soluble salts thereof, and organic peroxo acids.

6. The method as claimed in claim 1, wherein the fiber material comprises at least one type of fibers selected from the group consisting of natural organic and inorganic fibers.

7. The method as claimed in claim 1 wherein an aqueous liquid discharged from the bleaching procedure is recovered and returned to the bleaching procedure.

8. A method of bleaching a fiber material comprising:

(1) pretreating a fiber material with an aqueous solution of a stabilizing agent comprising:

(A) a first component comprising at least one member selected from the class consisting of (α-hydroxyacrylic homopolymers and copolymers of α-hydroxyaxrylic acid with other comonomers, and water-soluble salts and polylactones of the above-mentioned homopolymers and copolymers;

(B) a second component comprising at least one member selected from the class consisting of homopolymers and copolymers of acrylic acid, methacrylic acid and maleic acid, copolymers of at least one of the abovementioned acids with other monomers and water-soluble salts of the above-mentioned homopolymers and copolymers; and (C) a third component comprising at least one member selected from the class consisting of diethylenetriaminepentaacetic acid, triethylenetetramine hexaacetic acid and water-soluble salts of the above-mentioned acids;

the first, second and third components (A), (B) and (C) being present in a mixing ratio in weight of 5 to 50:20 to 70:20 to 70; and (2) bleaching the pretreated fiber material with an aqueous solution of a bleaching agent comprising at least one bleaching peroxide compound.

9. The method as claimed in claim 8, wherein the fiber material comprises at least one type of fibers selected from the group consisting of natural organic and inorganic fibers.

10. The method as claimed in claim 8, wherein the pretreating procedure (1) is carried out at a temperature of 20 to 120° C. for 15 to 180 minutes.

11. The method as claimed in claim 8, wherein the aqueous solution of the stabilizing agent contains the stabilizing agent in a concentration of 1 to 70% and has a pH value of 6 to 11, the stabilizing agent being present in an amount of 0.01 to 5% based on the absolute dry weight of the fiber material.

12. The method as claimed in claim 8, wherein the stabilizing agent further comprises (D) a fourth component comprising at least one water-soluble inorganic magnesium salt, in addition to the first, second and third components (A), (B) and (C).

13. The method as claimed in claim 8, wherein the aqueous solution of the stabilizing agent further comprises a bleach-promoting enzyme.

14. The method as claimed in claim 8, wherein the bleaching agent for the bleaching procedure (2) comprises at least one member selected from the group consisting of hydrogen peroxide, peroxyhydrates, peroxomonosulfuric acid and water-soluble salts thereof, and organic peroxo acids.

15. The method as claimed in claim 8, wherein an aqueous liquid discharged from the pretreating procedure is recovered and returned to the pretreating procedure.

* * * * *